(12) United States Patent
Bates et al.

(10) Patent No.: US 6,628,964 B1
(45) Date of Patent: Sep. 30, 2003

(54) COMBINATION CORDLESS TELEPHONE AND REMOTE CONTROL FOR ENTERTAINMENT EQUIPMENT

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 09/620,027

(22) Filed: Jul. 20, 2000

(51) Int. Cl.[7] .............................. H04B 1/38; H04M 1/00
(52) U.S. Cl. ...................... 455/556; 455/551; 455/575; 455/90; 348/14.05
(58) Field of Search ................................ 455/556, 550, 455/557, 90, 575, 418–420, 350, 551, 91, 92, 95, 403, 425, 426; 348/14.01–14.05; 345/169, 156, 168

(56) References Cited

U.S. PATENT DOCUMENTS

| | | | |
|---|---|---|---|
| 5,963,624 A | 10/1999 | Pope | |
| 6,292,210 B1 * | 9/2001 | Gerszberg et al. | 348/14.01 |
| 6,407,325 B2 * | 6/2002 | Yi et al. | 84/610 |
| 6,445,933 B1 * | 9/2002 | Pettit | 455/556 |

* cited by examiner

*Primary Examiner*—Nay Maung
*Assistant Examiner*—Edan Orgad
(74) *Attorney, Agent, or Firm*—Bracewell & Patterson, LLP; Roy W. Truelson

(57) ABSTRACT

A cordless communication and control device has a handset that includes communications equipment and remote control equipment. The communications equipment provides cordless telephone functionality, and the remote control equipment provides for remote control of one or more entertainment appliances. The handset also includes a mode controller in communication with the communications equipment and the remote control equipment. The mode controller provides at least one convenience mode. When a convenience mode is active, the mode controller responds to detection of an incoming call by automatically limiting utilization of the communications equipment and/or one or more entertainment appliances, based on the active convenience mode. In a first embodiment, the cordless communication and control device automatically limits the utilization by automatically preventing the communications equipment from producing an audible indication of the incoming call. In a second embodiment, the cordless communication and control device limits the utilization by automatically causing the remote control equipment to reduce the volume of an entertainment appliance.

17 Claims, 5 Drawing Sheets

COMBINATION CORDLESS TELEPHONE AND REMOTE CONTROL FOR ENTERTAINMENT EQUIPMENT

BACKGROUND OF THE INVENTION

1. Technical Field

The present invention relates in general to telephones and entertainment equipment (or "entertainment appliances") and, in particular, to cordless telephones and remote controls for entertainment appliances. Still more particularly, the present invention relates to a device that provides both telephonic and remote control capabilities.

2. Description of the Related Art

In recent years, advances in the field of semiconductor fabrication have made it possible to manufacture devices, such as cordless telephones and universal remote controls, at costs and in sizes that are acceptable to wide segments of the buying public. Consequently, such devices have become common personal convenience items.

For the purposes of this document, the term "cordless telephone" refers to a telephone handset in which electromagnetic radiation (such as radio waves) is utilized, in lieu of a cable or telephone cord, to carry communications to and from the handset. The term refers primarily to relatively low-power handsets that are designed to communicate with a corresponding base station (which is connected to a building's internal wiring via a telephone cord). However, the term also includes "wireless telephones" and "cellular telephones," which are not limited to communicating with a single, low-power base station.

One of the advantages of cordless telephones is that they are easy to keep nearby for use in answering incoming calls. For instance, if a person wanted to sit on a couch and watch television, that person might place a cordless telephone within arm's reach on a nearby coffee table or end table. Then, if a call were to come in, the call could be answered without rising from the couch. Furthermore, being cordless, the phone would not present the tripping hazard of a cord strung from a wall outlet across the floor to the coffee table or end table.

The universal remote control is another type of personal convenience item that has attained widespread acceptance and utilization as advances in the semiconductor industry have reduced the associated production costs and size requirements. For the purposes of this document, the term "universal remote control" refers to a handheld device that accepts operator input and, in response, transmits corresponding control signals to entertainment appliances via electromagnetic radiation (such as via pulses of infrared light). The term refers primarily to a single device with multiple operating modes which can be elected individually, thereby facilitating the remote control of multiple entertainment appliances (e.g., a television set, a video cassette recorder (VCR), a stereo receiver, etc.). However, the term should also be understood to include a remote control that can only be utilized to operate a single device (such as a remote control that can be used to control a television set but not a VCR).

If a person were to sit on a couch to watch TV, in addition to placing a cordless phone nearby, one might also place a universal remote control nearby. That way, if a call were to come in, the remote control could be used, for example, to quickly reduce the volume of the entertainment appliance before the call is answered. Clearly, therefore, cordless telephones and universal remote controls each provide certain benefits with regard to their respective fields of application (i.e., the fields of personal communications and utilization of entertainment appliances, respectively).

However, conventional cordless telephones and conventional universal remote controls are typically limited to manual operation. That is, when, for example, an operator wants the volume of an entertainment appliance to be reduced, the operator must locate the universal remote control and operate the volume reduction button. However, as recognized by the present invention, manual operations entail a lesser degree of convenience than would be enjoyed if those operations were to be automated. Moreover, since one of the primary objectives of cordless telephones and universal remote controls is to optimize the operator's personal convenience, any significant increase in convenience would be important. The present invention recognizes that manual operations are inconveniences and that conventional cordless telephones and conventional universal remote controls could be substantially improved if any heretofore manual operations could be automated.

U.S. Pat. No. 5,963,624 issued to Steven M. Pope discloses that remote control functionality can be added to a cordless telephone assembly including a handset and a base unit. In particular, the Pope patent relates to a cordless telephone adapted for controlling entertainment appliances via the base unit while the cordless telephone is being utilized in a room other than the room containing the entertainment appliances and the base unit. Accordingly, the Pope patent does not teach automating any telephonic or remote control features. To the contrary, Pope explicitly advises against automatically muting a compact disk (CD) player (for example), in case someone is listening in the room with the CD player while the cordless telephone is being utilized in a different room.

Pope also discusses U.S. Pat. No. 5,128,987 issued to McDonough, U.S. Pat. No. 5,542,102 issued to Smith et al., and Korean Patent no. 90-7064. In particular,. Pope explains that the Korean patent relates to a handset that includes an infrared transmitter for muting a television. Further, according to Pope, the McDonough and Smith et al. patents disclose base units that automatically transmit a mute signal to an entertainment appliance either in response to an off-hook condition or in response to activity at the base unit, respectively. None of the above patents, however, contain any suggestion to provide a device that can be customized by an operator to change the way automatic responses are made to changing conditions, where the conditions may relate to an entertainment appliance (such as when a channel is changed) and/or to the communications equipment (such as when a new call comes in).

In contrast to the prior art devices, the present invention relates to a combination cordless telephone and universal remote control that includes a programmable mode controller. This mode controller allows an operator to customize how responses are made to changing conditions, thereby allowing the operator to enjoy greater personal convenience, relative to the prior art devices.

SUMMARY OF THE INVENTION

The present invention relates to a cordless communication and control device having a handset that includes communications equipment and remote control equipment. The communications equipment provides cordless telephone functionality, and the remote control equipment provides for remote control of one or more entertainment appliances. The handset also includes a mode controller in communication with the communications equipment and the remote control equipment. The mode controller provides at least one convenience mode. When a convenience mode is active, the mode controller responds to detection of an incoming call by automatically limiting utilization of the communications equipment and/or one or more entertainment appliances, based on the active convenience mode.

In a first embodiment, the cordless communication and control device automatically limits the utilization by automatically preventing the communications equipment from producing an audible indication of the incoming call. In a second embodiment, the cordless communication and control device limits the utilization by automatically causing the remote control equipment to reduce the volume of an entertainment appliance.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
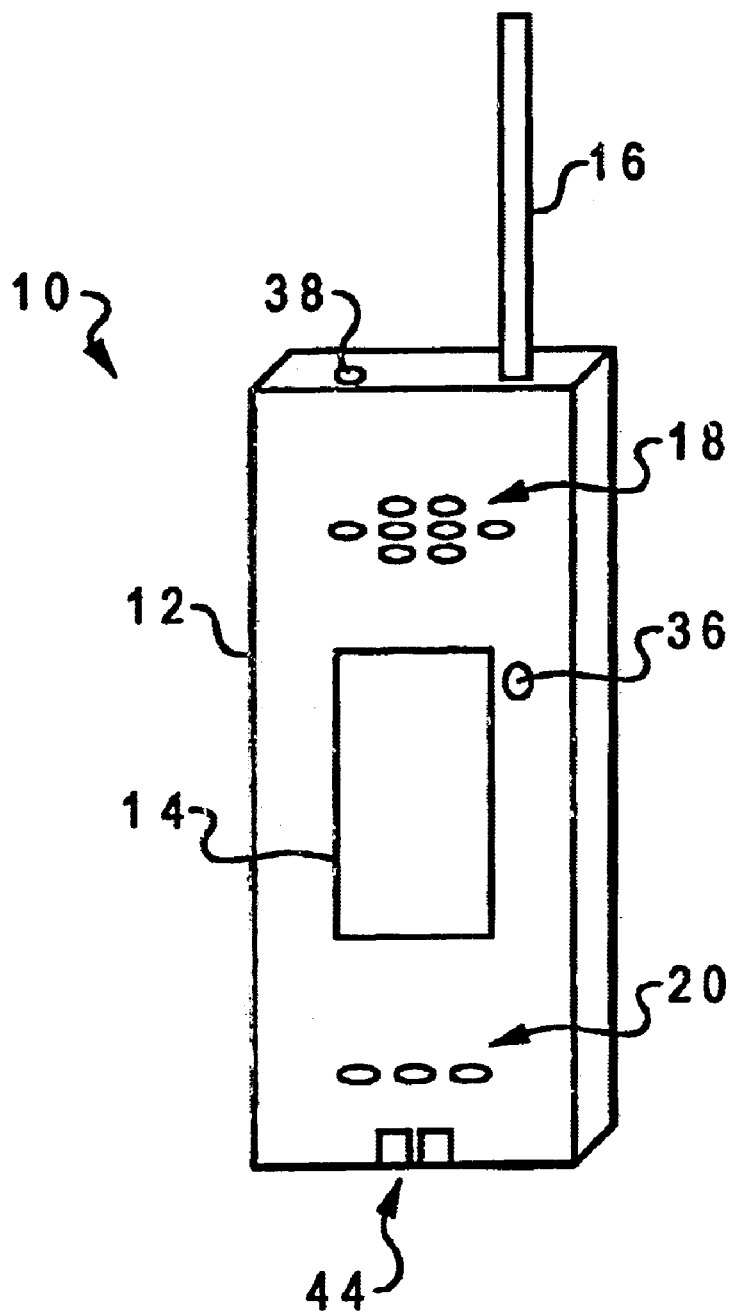
FIG. 1 depicts an illustrative embodiment of a cordless communication and control device according to the present invention.
Figure 2:
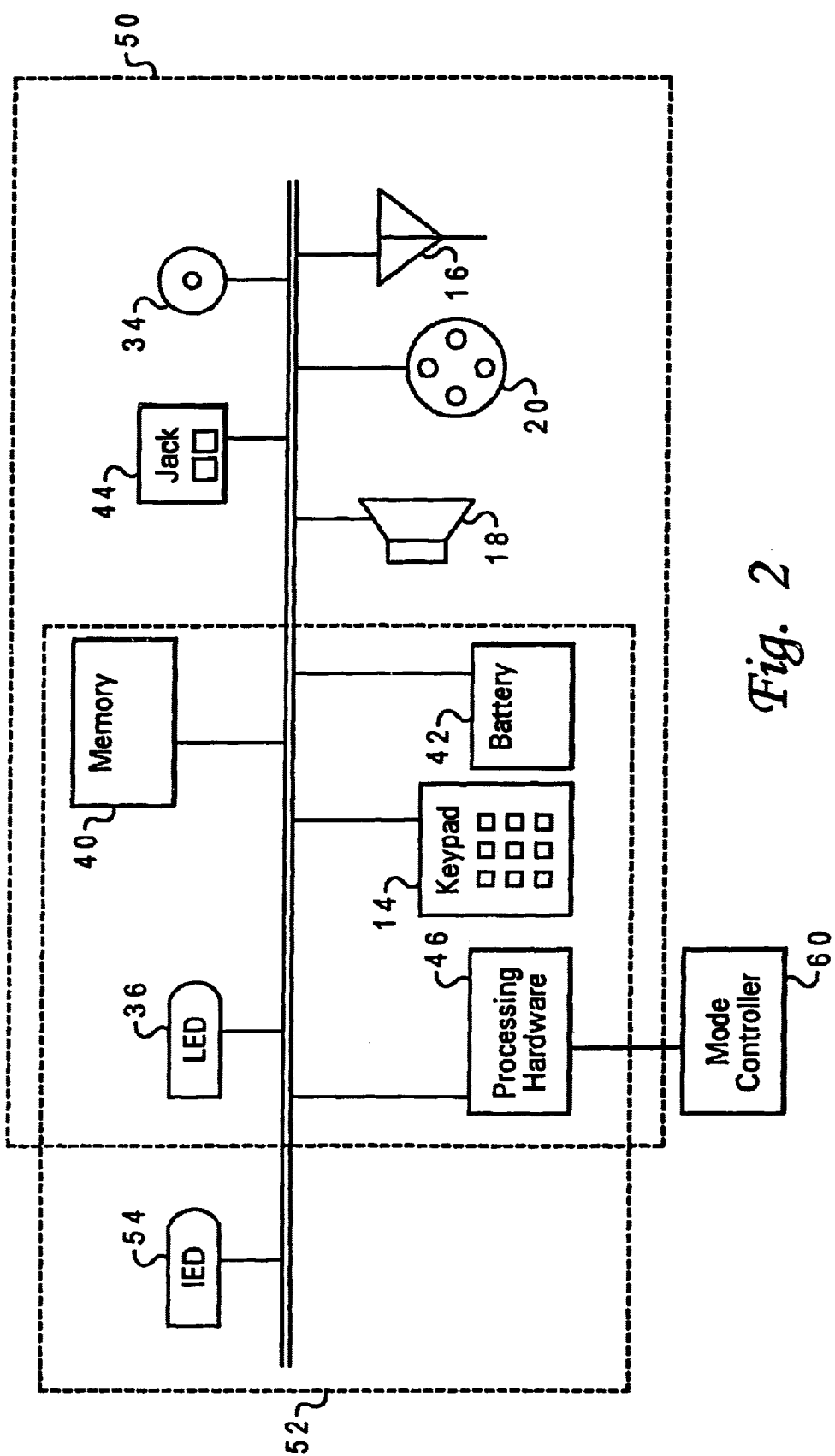
FIG. 2 illustrates a block diagram of the electrical components of the illustrative cordless communication and control device of FIG. 1.

With reference now to the figures and in particular with reference to FIGS. 1 and 2, there is illustrated an exemplary embodiment of a cordless communication and control device (CCCD) 10 according to the present invention. FIG. 1 depicts a front view of the exterior of CCCD 10, and FIG. 2 provides a high-level block diagram of certain electrical components of CCCD 10.

As shown in FIG. 1, like a conventional cordless telephone handset, CCCD 10 features a housing 12, a keypad 14 in a face of housing 12, and an antenna 16 extending from an end of housing 12. Situated proximal sound-permeable apertures within housing 12 are a speaker 18 and a microphone 20. As illustrated in FIG. 2, CCCD 10 further contains a ringer 34 (e.g., a piezoelectric crystal) for producing audible indications of incoming calls, as well as a light-emitting diode (LED) 36 for indicating when the handset is powered on. Also included is a non-volatile memory 40 (i.e., a memory that retains data even when the handset is not powered on). As illustrated, CCCD 10 further includes a portable source of power (preferably, a rechargeable battery 42) and a recharge jack 44 for obtaining power from a base station or other recharge device (not illustrated) for recharging battery 42. The foregoing components are controlled by processing hardware 46 to provide all of the functionality provided by conventional cordless telephones. Accordingly, those components (including the associated processing hardware 46) are referred to herein collectively as "communications equipment" 50.

As illustrated in FIG. 2, in addition to communications equipment 50, CCCD 10 contains remote control equipment 52 that provides all of the functionality provided by conventional universal remote controls. That equipment includes an infrared-emitting diode (IED) 54 for transmitting control signals to entertainment appliances (not illustrated). In alternative embodiments of the present invention, remote control equipment 52 could be distinct and separate from communications equipment 50. However, in the illustrative embodiment, some of the components of CCCD 10 serve both as communications equipment 50 and as remote control equipment 52. For example, as shown in the area embraced by both of the two dashed boxes in FIG. 2, in the illustrative embodiment, double duty is served by keypad 14, rechargeable battery 42, processing hardware 46, non-volatile memory 40, and LED 36. Thus, for instance, in addition to indicating when communication equipment 50 is powered on, LED 36 is also utilized to indicate that operator input for controlling an entertainment appliance is being received from keypad 14.

As FIG. 2 also reveals, in addition to communications equipment 50 and remote control equipment 52, CCCD 10 includes a component that appears neither in conventional cordless telephones nor in conventional universal remote controls. That component is the mode controller 60. Mode controller 60 is not part of communications equipment 50 and not part of remote control equipment 52. Instead, mode controller is a programmable bridge that functionally connects communications equipment 50 and remote control equipment 52 in such a way as to provide for enhanced operator convenience. In the illustrative embodiment, mode controller 60 is implemented in semiconductor hardware that is operatively connected to processing hardware 46. In alternative embodiments, however, mode controller 60 could be implemented as firmware, software, or a combination of hardware, firmware, and/or software.

Figure 3:
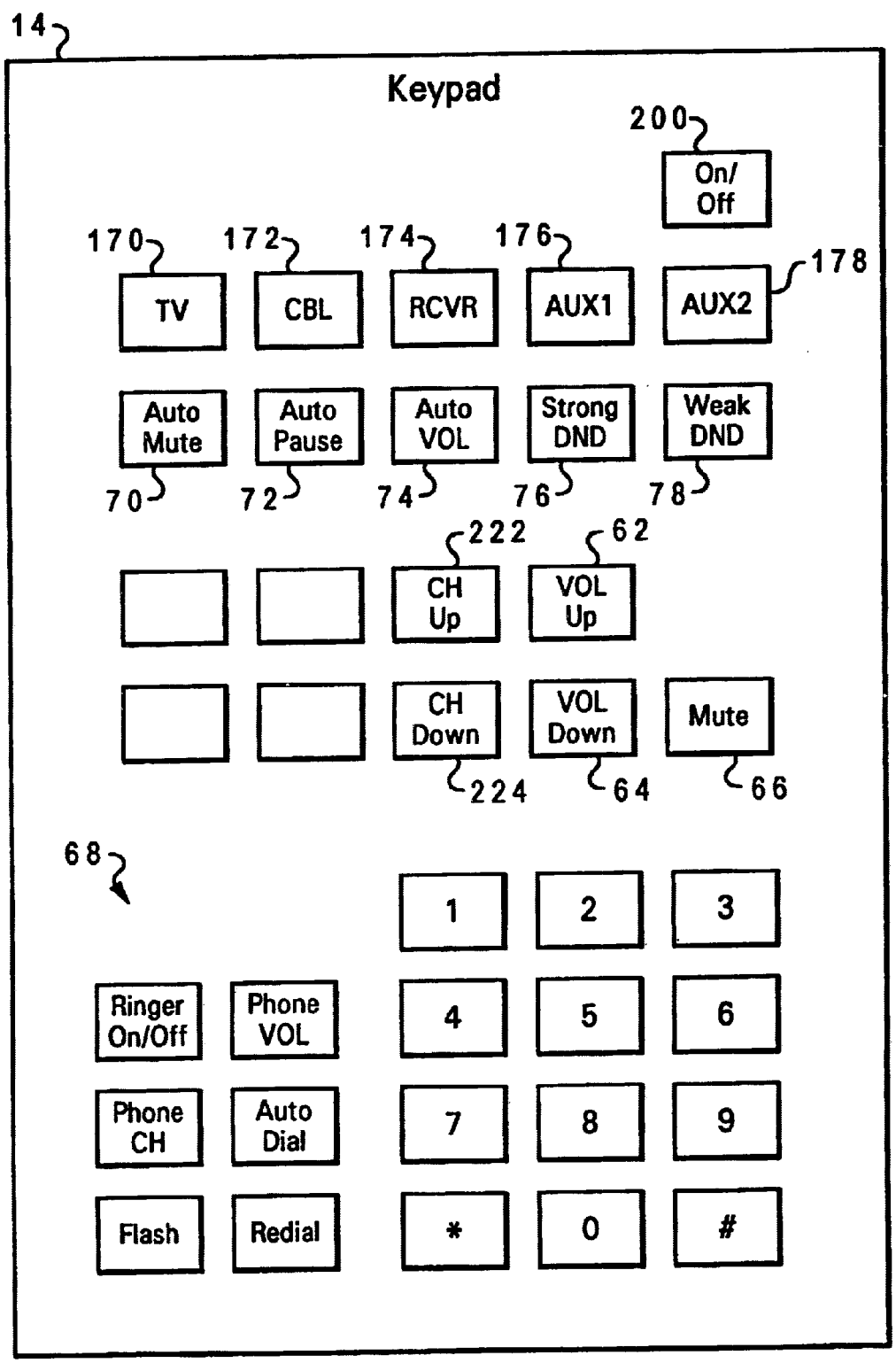
FIG. 3 depicts the keypad of the illustrative cordless communication and control device of FIG. 1.

Referring now to FIG. 3, keypad 14 includes a number of keys or buttons associated conventionally with the operation of cordless telephones and remote controls. Those keys may include, for example, appliance selection keys (such as Television key 170, Cable key 172, Audio Receiver key 174, First Auxiliary Appliance (AUX1) key 176, and Second Auxiliary Appliance (AUX2) key 178). The keypad may also include a Volume Up key 62, a Volume Down key 64, and a Mute key 66 for remotely altering the volume level of the entertainment appliances. Likewise, the keypad may contain a different set of keys 68 for controlling various aspects of the cordless telephone, including, for example, keys for manually disabling ringer 34, for changing the channel used to communication with the base station, for producing a temporary on-hook condition, for adjusting the volume of speaker 18, for dialing a number that has been stored in memory 40, and for redialing the last telephone number dialed.

In addition to the keys described in the above paragraph, keypad 14 includes a set of keys that are dedicated to the purpose of programming mode controller 60. In particular, keypad 14 includes keys for activating and deactivating five different modes of automatically responding to changing circumstances. Those five modes, known as "convenience modes," optimize the convenience for the operator by automatically reducing the extent to which communications equipment 50 might interfere with utilization of entertainment appliances and/or the extent to which entertainment appliances might interfere with utilization of communication equipment 50. Indeed, certain convenience modes substantially eliminate unwanted interference between communications equipment 50 and remote control equipment 52.

The five convenience modes are known as Auto Mute mode, Auto Pause mode, Auto VOL mode, Strong Do-Not-Disturb (DND) mode, and Weak DND mode. As described in greater detail below, in the Auto Mute, Auto Pause, and Auto VOL modes, the operation of entertainment appliances is automatically and dynamically limited to facilitate utilization of communications equipment 50. By contrast, in the Strong and Weak DND modes, operation of communications equipment 50 is automatically limited to facilitate uninterrupted utilization of entertainment appliances. An operator may program a selected mode to be active by depressing Auto Mute key 70, Auto Pause key 72, Auto VOL key 74, Strong DND key 76, and Weak DND key 78. Depressing one of those convenience mode keys causes mode controller 60 to activate the corresponding convenience mode and to respond to changing conditions accordingly.

Figure 4A:
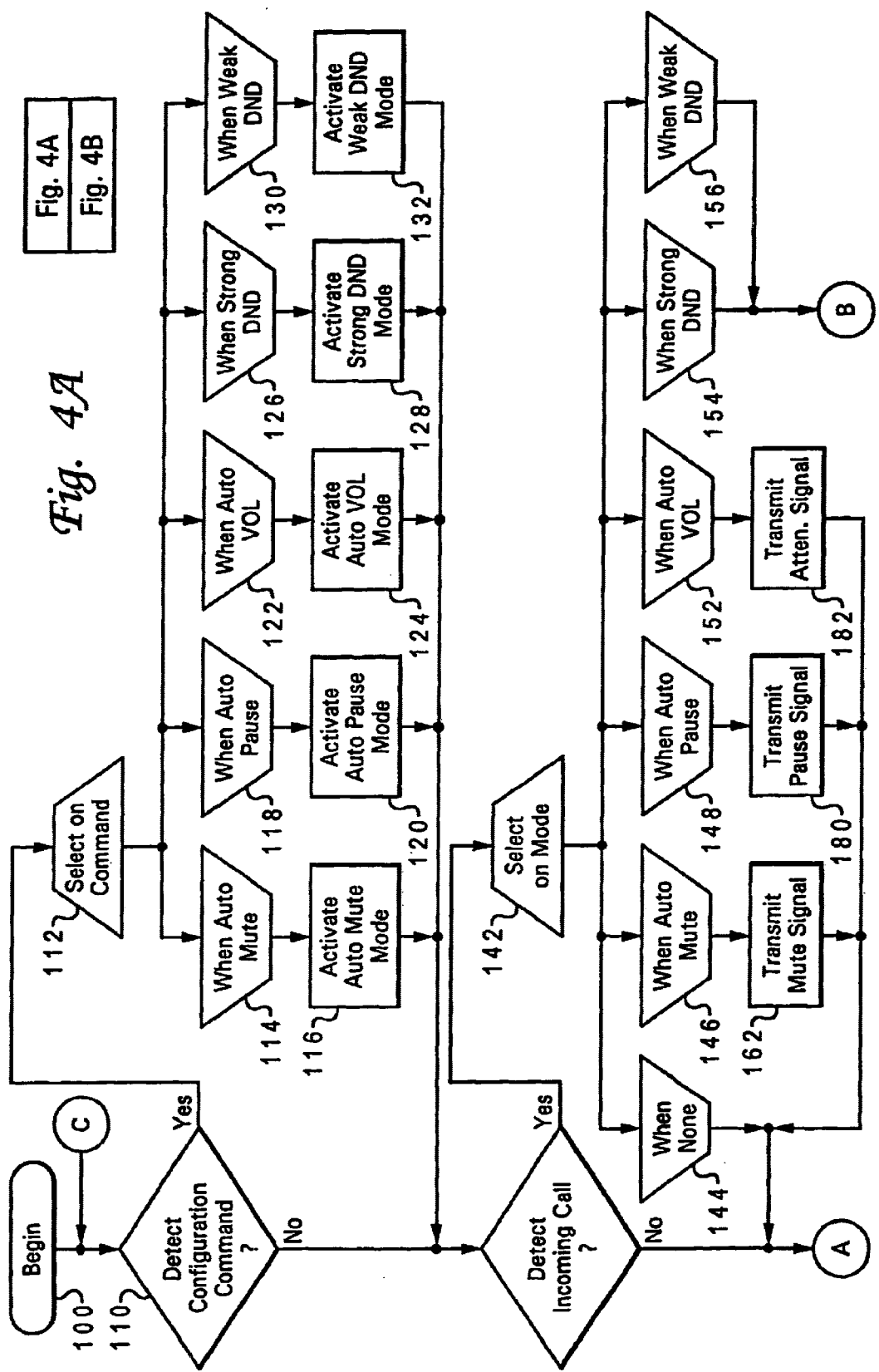
FIGS. 4A and 4B illustrate a high-level logical flowchart of an exemplary process for optimizing operator convenience,,according to the present invention.
Figure 4B:
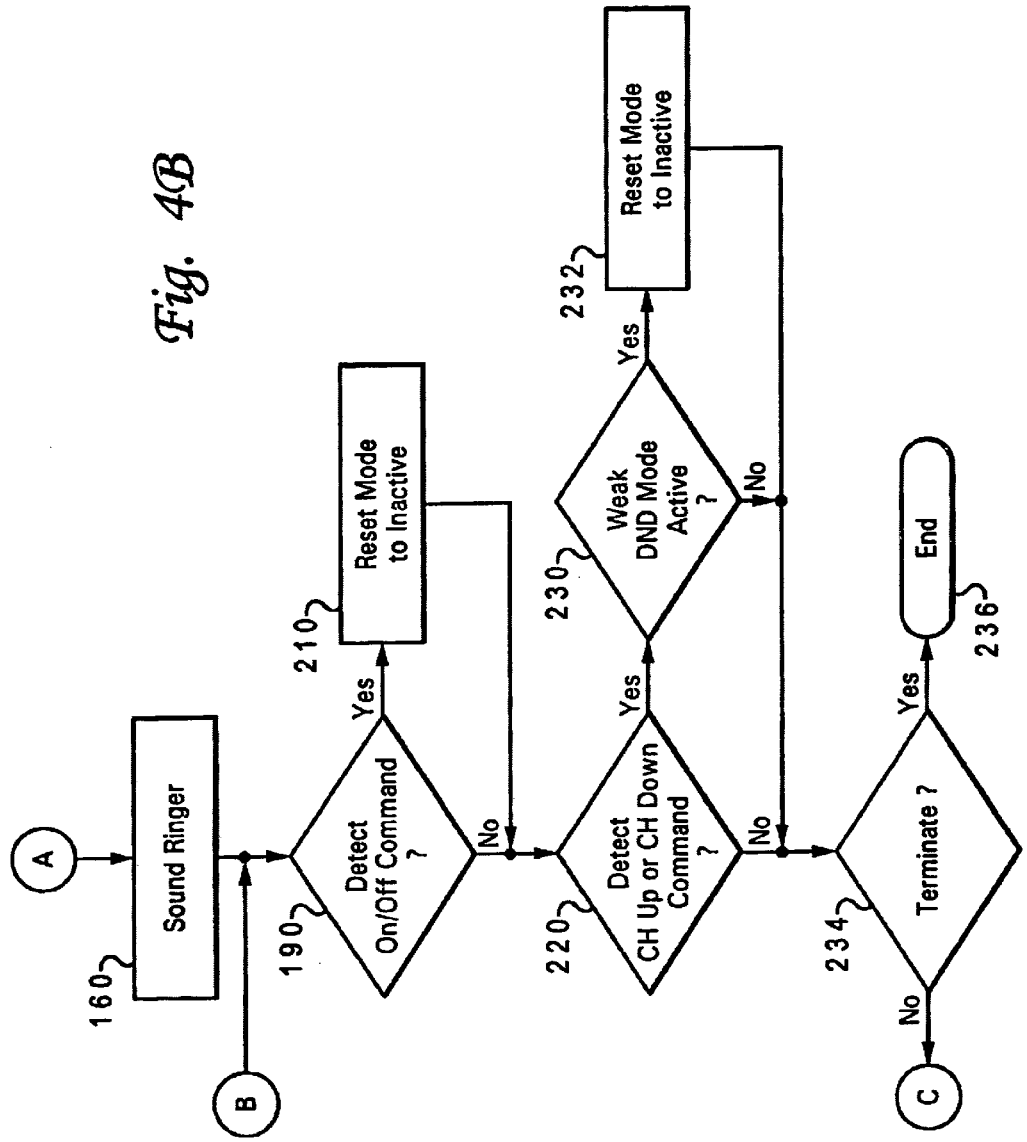

With reference now to FIGS. 4A and 4B, there is illustrated a high-level logical flowchart of an exemplary process, in accordance with the present invention, for accepting operator input for the five convenience modes and for responding to changing conditions in accordance with those modes. The process begins at block 100 with CCCD 10 monitoring keypad 14 and communications equipment 50 for such changes in conditions as mode controller 60 is designed (by the manufacturer) or programmed (by the operator) to recognize as warranting response. As illustrated at block 110, one step in that monitoring involves the determination of whether an operator has entered a configuration command by depressing one of the convenience mode keys. If a configuration command is detected, the process passes to block 112, which illustrates a select function that directs the process along an appropriate path of execution, based on the particular configuration command detected.

Specifically, if mode controller 60 detects that Auto Mute key 70 has been depressed, the process passes through block 114 to block 116, which illustrates mode controller 60 activating the Auto Mute mode. Alternatively, if manipulation of Auto Pause key 72 is detected, the process passes through block 118 to block 120, which depicts mode controller 60 activating the Auto Pause mode. As illustrated in blocks 122 through 132, when mode controller 60 detects instead that the Auto VOL key 74, Strong DND key 76, or Weak DND key 78 has been depressed, a similar process is followed to activate Auto VOL mode, Strong DND mode, or Weak DND mode, respectively.

However, if a configuration command is not detected, the process passes from block 110 to block 140, which depicts mode controller determining whether an incoming call is being received by communications equipment 50. If so, a determination is made as to which of the convenience modes, if any, has been activated, as shown at blocks 142 through 156. If it is determined that none of the convenience modes is active, the process simply passes through block 144 and page connector A to block 160, which illustrates mode controller 60 allowing communications equipment 50 to sound ringer 34.

On the other hand, if it is determined that Auto Mute mode is active, the process passes from block 142 through block 146 to block 162, which illustrates mode controller 60 automatically utilizing remote control equipment 52 to transmit a mute signal to a current entertainment appliance, thereby causing that appliance to silence its volume. Which entertainment appliance is "current" is preferably determined by reference to which appliance was last selected for control via the appliance selection keys. Alternatively, mute signals could be automatically transmitted to all of the entertainment appliances that are under the control of remote control equipment 52. In any case, once the mute signal(s) has been transmitted, the process passes through page connector A and ringer 34 is sounded, as shown at block 160.

If, instead, it is determined that Auto Pause mode is active, the process passes from block 142 through block 148 to block 180, which illustrates mode controller 60 automatically utilizing remote control equipment 52 to transmit a pause signal to the current entertainment appliance (or to all of the entertainment appliances). The pause signal causes the playback of any recorded media (such as a video or audio cassette, a CD, etc.) to be suspended. Likewise, in an entertainment system that includes a digital video recorder (such as a TIVO®-based recorder), the pause signal may cause the digital video recorder to suspend presentation of a current television broadcast (with the broadcast being buffered in a data storage medium, so that presentation or playback may subsequently be resumed). Once the pause signal has been transmitted, the process passes through page connector A and ringer 34 is sounded, as shown at block 160.

A determination that Auto VOL mode is active, however, causes the process to pass from block 142 through blocks 152 and 182 to block 160. Blocks 182 and 160 illustrate mode controller 60 automatically utilizing remote control equipment 52 to transmit one or more volume-attenuation signals to an appropriate entertainment appliance or appliances and then sounding ringer 34. The three convenience modes described above thus automatically reduce or substantially eliminate sounds from the entertainment appliances that might otherwise interfere with the operator's utilization of communications equipment 50. For example, by automatically muting, pausing, or attenuating the entertainment equipment, mode controller 60 makes it easier for the operator to hear the ringing communications equipment and, upon answering an incoming call, to hear the other party.

Referring now back to block 142, if it is instead determined that either Strong DND or Weak DND mode is active (as shown at blocks 154 and 156, respectively), mode controller 60 prevents the incoming call from interfering with the entertainment appliances by preventing communications equipment 50 from sounding ringer 34. Instead, the process passes through page connector B to the determination depicted at block 190. This determination is also made after ringer 34 had been sounded in response to an incoming call after the other convenience modes have been processed (including when no convenience mode is active), as described above.

As illustrated at block 190, mode controller 60 then determines whether an operator has depressed the On/Off key 200 of CCCD 10. If it is determined that On/Off key 200 has been depressed, mode controller 60 resets (i.e., inactivates) all of the convenience modes (including Strong DND mode.), as shown at block 210.

After the convenience modes have been reset, or if it is determined that On/Off key 200 has not been depressed, the process proceeds to block 220. Block 220 illustrates mode controller 60 determining whether the Channel Up key 222 or the Channel Down key 224 has been depressed. If so, mode controller 60 then determines whether Weak DND mode is active, as depicted at block 230. If so, mode controller 60 inactivates Weak DND mode, as shown at block 232. Thus, after an operator has programmed Weak DND mode to be active, the operator will not be disturbed by incoming calls while watching a single channel, but the Weak DND mode is inactivated if the operator changes the television channel or turns off the entertainment equipment with CCCD 10. Strong DND mode provides similar protection from interruption, but remains active despite changes in channel. In addition, an operator may inactivate any convenience mode by activating any other convenience mode.

After the determination illustrated in block 220 (and any appropriate subordinate operations) have been performed, the process passes to block 234, which depicts an illustration of whether monitoring should be terminated. If so, the process ends, as shown at block 236. Ordinarily, however, the monitoring process described above simply resumes, beginning at block 110 (by way of page connector C).

In summary, the present invention relates to a cordless communication and control device with a programmable mode controller that automatically limits utilization of communications equipment and/or one or more entertainment appliances to reduce or substantially eliminate interference and/or interruptions. The operator may select from among five convenience modes, including three which automatically facilitate utilization of communications equipment and two which automatically prevent communications equipment from interrupting or interfering with utilization of one or more entertainment appliances.

While the invention has been particularly shown and described with reference to an illustrative embodiment, it will be understood by those skilled in the art that various changes in form and detail may be made therein without departing from the spirit and scope of the invention. For example, technology other than infrared might be utilized to transmit remote control signals to the entertainment appliances. Likewise, something other than a customary keypad (e.g., one or more touch-sensitive display screens) could be utilized to obtain user input in alterative embodiments of the present invention. Also, although recharging is accomplished in the illustrative embodiment by use of a recharge port, that port could be omitted and power maintained, instead, through use of spare batteries that are recharged outside of the handset and used to replace a discharged battery in the handset as needed. The present invention could as well be implemented in alternative embodiments including more of fewer keys than those illustrated herein. In addition, numerous other changes could also be made. Any cordless communication and control device incorporation such changes should not be perceived as departing from the present invention, however, unless that changed device falls outside the scope of the following claims.

What is claimed is:

1. A cordless communication and control device comprising:

a handset that includes communications equipment and remote control equipment; and a mode controller in communication with said communications equipment and said remote control equipment, wherein said mode controller provides a plurality of operator-selectable convenience modes which are activated by a common operator input mechanism;

wherein said mode controller accepts an operator input through said common operator input mechanism activating an operator-selected one of said plurality of convenience modes;

wherein when a first convenience mode of said plurality of convenience modes is activated responsive to a selection by said operator, said mode controller in response to detection of an incoming call, automatically limits utilization of said communications equipments and wherein when a second convenience mode of said plurality of convenience modes is activated responsive to a selection by said operator said mode controller, in response to detection of an incoming call, automatically limits utilization of said one or more entertainment appliances.

2. A cordless communication and control device according to claim 1, wherein:

said communications equipment provides cordless telephone functionality; and said remote control equipment provides for remote control of said one or more entertainment appliances.

3. A cordless communication and control device according to claim 1, wherein said mode controller automatically limits said utilization of said communications equipment by automatically preventing said communications equipment from producing an audible indication of said incoming call.

4. A cordless communication and control device according to claim 1, wherein said mode controller automatically limits said utilization of said one or more entertainment appliances by automatically causing said remote control equipment to modify at least one setting of said one or more entertainment appliances.

5. A cordless communication and control device according to claim 1, wherein said plurality of convenience modes comprise:

a do-not-disturb mode, wherein said communications equipment is prevented from producing an audible indication of said incoming call;

an auto-mute mode, wherein said one or more entertainment appliances is muted in response to detection of said incoming call;

an auto-attenuation mode, wherein at least one volume control of said one or more entertainment appliances is adjusted downward in response to detection of said incoming call; and an auto-pause mode, wherein playback from at least one storage medium of said one or more entertainment appliances is paused in response to detection of said incoming call.

6. A cordless communication and control device according to claim 1, wherein:

said plurality of convenience modes comprise a weak do-not-disturb mode and a strong do-not-disturb mode, each of which, when active, causes said mode controller to prevent said communications equipment from producing an audible indication of said incoming call;

said cordless communication and control device further comprises at least one channel changing key and at least one power key;

in response to manipulation of said at least one power key, said mode controller automatically ensures that said weak do-not-disturb mode and said strong do-not-disturb mode are inactivated;

in response to manipulation of said at least one channel changing key, said mode controller automatically ensures that said weak do-not-disturb mode is inactivated but does not alter said strong do-not-disturb mode.

7. A method for automatically limiting concurrent utilization of communications equipment and one or more entertainment appliances, said method comprising:
   providing a handset that includes communications equipment, remote control equipment, and a mode controller in communication with said communications equipment and said remote control equipment, wherein said mode controller provides a plurality of operator-selectable convenience modes which are activated by a common operator input mechanism:
   wherein a first convenience mode of said plurality of convenience modes corresponds to automatically limiting utilization of said communications equipment in response to detection of an incoming call:
   wherein a second convenience mode of said plurality of convenience modes corresponds to automatically limiting utilization of said one or more entertainment appliances in response to detection of an incoming call,
   receiving operator input through said common operator input mechanism activating an operator-selected one of said plurality of convenience modes;
   detecting an incoming call at said mode controller;
   determining that said operator-selected convenience mode is active, and
   in response to detection of said incoming call, automatically limiting utilization of at least one of said communications equipment and said one or more entertainment appliances, corresponding to said operator-selected active convenience mode.

8. The method of claim 7, wherein said step of automatically limiting said utilization comprises automatically preventing said communications equipment from producing an audible indication of said incoming call.

9. The method of claim 7, wherein said step of automatically limiting said utilization comprises automatically causing said remote control equipment to modify at least one setting of said one or more entertainment appliances.

10. The method of claim 7, wherein:
   said plurality of convenience modes comprise four or more convenience modes, including
      a do-not-disturb mode, wherein said communications equipment is prevented from producing an audible indication of said incoming call:
      an auto-mute mode, wherein said one or more entertainment appliances is muted in response to detection of said incoming call;
      an auto-attenuation mode, wherein at least one volume control of said one or more entertainment appliances is adjusted downward in response to detection of said incoming call; and;
      an auto-pause mode, wherein playback from at least one storage medium of said one or more entertainment appliances is paused in response to detection of said incoming call; and
   said step of accepting operator input comprises accepting operator input activating one of said four or more convenience modes.

11. The method of claim 7, wherein:
   said plurality of convenience modes comprise a weak do-not-disturb mode and a strong do-not-disturb mode each of which, when active, causes said mode controller to prevent said communications equipment from producing an audible indication of said incoming call;
   said cordless communication and control device further comprises at least one channel changing key and at least one power key; and
   said method further comprises
      in response to manipulation of said at least one power key, automatically ensuring that said weak do-not-disturb mode and said strong do-not-disturb mode are inactivated: and
      in response to manipulation of said at least one channel changing key, automatically ensuring that said weak do-not-disturb mode is inactivated but leaving said strong do-not-disturb mode unaltered.

12. An apparatus that provides at least one convenience mode for a cordless communication and control device that includes communications equipment and remote control equipment, said apparatus comprising:
   a mode controller that provides a plurality of operator-selectable convenience modes which are activated by a common operator input mechanism ;
   wherein said mode controller accepts an operator input through said common operator input mechanism activating an operator-selected one of said plurality of convenience modes;
   wherein when said mode controller is in communication with said communications equipment and said remote control equipment and a first convenience mode of said plurality of convenience modes is activated responsive to a selection by said operator, said mode controller, in response to detection of an incoming call, automatically limits utilization of said communications equipment; and
   wherein when a second convenience mode of said plurality of convenience modes is activated responsive to a selection by said operator, said mode controller -in response to detection of an incoming call, automatically limits utilization of said one or more entertainment appliances.

13. An apparatus according to claim 12, wherein said mode controller automatically limits said utilization of said communications equipment by automatically preventing said communications equipment from producing an audible indication of said incoming call.

14. An apparatus according to claim 12, wherein said mode controller automatically limits said utilization of said one or more entertainment appliances by automatically causing said remote control equipment to modify at least one setting of said one or more entertainment appliances.

15. An apparatus according to claim 12, wherein said plurality of convenience modes comprise:
   a do-not-disturb mode, wherein said communications equipment is prevented from producing an audible indication of said incoming call;
   an auto-mute mode, wherein said one or more entertainment appliances is muted in response to detection of said incoming call;
   an auto-attenuation mode, wherein at least one volume control of said one or more entertainment appliances is adjusted downward in response to detection of said incoming call: and
   an auto-pause mode, wherein playback from at least one storage medium of said one or more entertainment appliances is paused in response to detection of said incoming call.

16. An apparatus according to claim 12, wherein:
   said plurality of convenience modes comprise a weak do-not-disturb mode and a strong do-not-disturb mode, each of which, when active, causes said mode controller to prevent said communications equipment from producing an audible indication of said incoming call.

said cordless communication and control device further comprises at least one channel changing key and at least one power key;

in response to manipulation of said at least one power key, said mode controller automatically ensures that said weak do-not-disturb mode and said strong do-not-disturb mode are inactivated;

in response to manipulation of said at least one channel changing key, said mode controller automatically ensures that said weak do-not-disturb mode is inactivated but does not alter said strong do-not-disturb mode.

17. An apparatus that provides at least one convenience mode for a cordless communication and control device that includes communications equipment and remote control equipment, said apparatus comprising:

a mode controller that provides at least one convenience mode, such that when said mode controller is in communication with said communications equipment and said remote control equipment and said at least one convenience mode is active, said mode controller, in response to detection of an incoming call, automatically limits utilization of at least one of said communications equipment and one or more entertainment appliances, based on said active convenience mode, wherein:

said mode controller supports two or more convenience modes;

said mode controller accepts operator input activating one of said two or more convenience modes;

said mode controller automatically limits said utilization in accordance with said activated convenience mode;

said two or more convenience modes comprise a weak do-not-disturb mode and a strong do-not-disturb mode, each of which, when active, causes said mode controller to prevent said communications equipment from producing an audible indication of said incoming call;

said cordless communication and control device further comprises at least one channel changing key and at least one power key;

in response to manipulation of said at least one power key, said mode controller automatically ensures that said weak do-not-disturb mode and said strong do-not-disturb mode are inactivated;

in response to manipulation of said at least one channel changing key, said mode controller automatically ensures that said weak do-not-disturb mode is inactivated but does not alter said strong do-not-disturb mode.

* * * * *